(12) United States Patent
Fella et al.

(10) Patent No.: US 7,822,078 B2
(45) Date of Patent: Oct. 26, 2010

(54) ERBIUM DOPED FIBRES

(75) Inventors: Paolo Fella, Valvori (IT); Rodolfo Di Muro, Coventry (GB)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 12/004,137

(22) Filed: Dec. 19, 2007

(65) Prior Publication Data
US 2008/0107139 A1    May 8, 2008

Related U.S. Application Data

(62) Division of application No. 10/531,156, filed on Nov. 7, 2005, now abandoned.

(30) Foreign Application Priority Data

Oct. 15, 2002  (IT) .......................... MI2002A2190
Oct. 14, 2003  (WO) ..................... PCT/GB03/04472

(51) Int. Cl.
*H01S 3/30* (2006.01)

(52) U.S. Cl. ............................... 372/6; 372/39
(58) Field of Classification Search ............ 372/6, 372/39
See application file for complete search history.

(56) References Cited

U.S. PATENT DOCUMENTS 5,299,215 A * 3/1994 Thrash et al. ................. 372/41
5,710,659 A * 1/1998 Cline ..................... 359/337.21
6,795,460 B1 * 9/2004 Itoh ............................ 372/34

* cited by examiner

*Primary Examiner*—Minsun Harvey
*Assistant Examiner*—Kinam Park
(74) *Attorney, Agent, or Firm*—Kirschstein, et al.

(57) ABSTRACT

A method of producing green light signals, comprising coupling pump signals from at least one pump source into at least one erbium doped fiber (EDF) which cause ground state absorption (GSA), and excited state absorption (ESA) in erbium ions of the EDF, which produces green light signals, wherein the majority of the pump signals have a wavelength at which the probability of occurrence of ESA in the EDF is greater than the probability of occurrence of GSA in the EDF. The majority of the pump signals may have a wavelength in the range approximately 920 nm to approximately 980 nm, or in the region of 960 nm. An erbium doped fiber amplifier (EDFA) (1) for amplifying traffic-carrying signals may be pumped by green light signals produced by this method. A laser which produces green light signals may be constructed, which comprises at least one EDF, coupled to at least one pump source to receive pump signals therefrom, which cause GSA, and ESA in erbium ions of the EDF, which produces green light signals, the majority of the pump signals having a wavelength at which the probability of occurrence of ESA in the EDF is greater than the probability of occurrence of GSA in the EDF.

35 Claims, 1 Drawing Sheet

ERBIUM DOPED FIBRES

CROSS-REFERENCE TO RELATED APPLICATION

Figure 1:
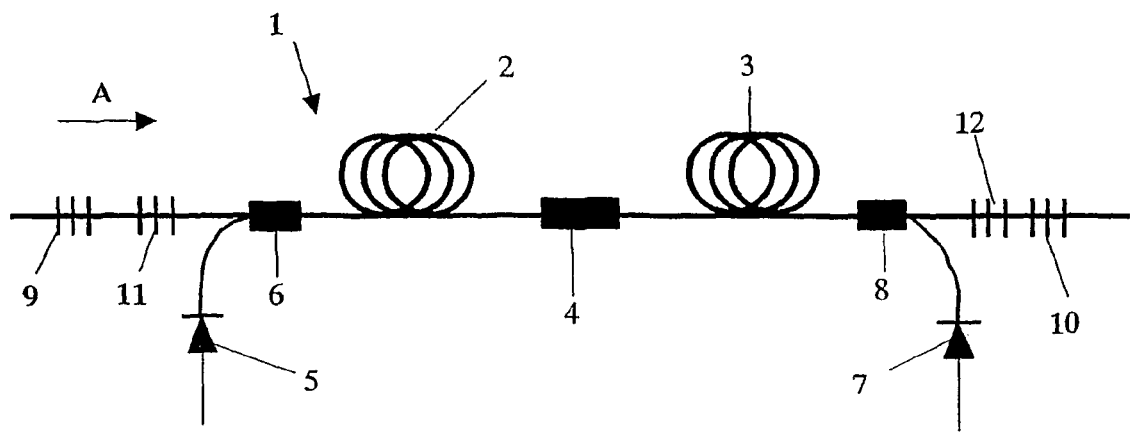

This application is a divisional application of U.S. Ser. No. 10/531,156, filed Nov. 7, 2005, now abandoned.

The invention relates to using erbium doped fibres for the production of green light signals, and particularly using such erbium doped fibres in amplifiers and lasers.

Erbium doped fibres (EDFs) have been used in various applications for some time. In particular, EDFs have been used in amplifiers in telecommunication networks. Such erbium doped fibre amplifiers (EDFAs) amplify traffic-carrying signals in the wavelength region of approximately 1520 nm to approximately 1610 nm, i.e. around 1550 nm. Amplification is achieved by the interaction of photons of the traffic-carrying signals with electrons of erbium ions in a metastable state, approximately 1550 nm above the erbium ion ground state. The interaction causes stimulated emission by the electrons, producing photons in phase with and of approximately the same wavelength as those of the traffic-carrying signals. Each photon of the traffic-carrying signals which interacts in this way thus becomes two photons, and amplification occurs.

For efficient amplification by the above process, the traffic-carrying signals need to encounter an EDF where more erbium ions are in the metastable state than in the ground state. This is achieved by a process known as pumping, in which signals from a pump source are coupled into the EDF where they are absorbed by electrons of erbium ions in the ground state populating the metastable state. Pump signal wavelengths of approximately 980 nm or 1480 nm are widely used, as the absorption spectra of EDFs exhibit peaks around these wavelengths and pump sources having these wavelengths are available. When 980 nm pump signals are used these cause ground state absorption (GSA) in the EDF, i.e. the 980 nm pump signals are absorbed by electrons of the erbium ions in the ground state raising them to a higher, pump state with subsequent decay to the metastable state. In addition to GSA of 980 nm pump signals another process, known as excited state absorption (ESA), also occurs within the EDF. In this, electrons of the erbium ions in the pump state absorb 980 nm pump signals raising them to yet higher, excited states from which they decay emitting photons having wavelengths in the range approximately 520 nm to approximately 560 nm, i.e. green light signals. Such ESA has heretofore been considered a negative effect, which results in a decrease of the efficiency of amplification in an EDFA by decreasing the population of the metastable state, and EDFA conditions have previously been chosen to minimise this effect and hence the production of green light signals. However, it has been realised by the inventors that such ESA-produced green light signals have a number of advantageous applications, e.g. they can be used to bring about an increase in the amplification of traffic-carrying signals in an EDFA. The invention therefore proposes the enhancement of green light signal production in an EDF, and applications of such green light signals.

According to a first aspect of the invention there is provided a method of producing green light signals, comprising coupling pump signals from at least one pump source into at least one erbium doped fibre (EDF) which cause ground state absorption (GSA), and excited state absorption (ESA) in erbium ions of the EDF, which produces green light signals, wherein the majority of the pump signals have a wavelength at which the probability of occurrence of ESA in the EDF is greater than the probability of occurrence of GSA in the EDF.

According to a second aspect of the invention there is provided a device for producing green light signals, comprising at least one erbium doped fibre (EDF), coupled to at least one pump source to receive pump signals therefrom, which cause ground state absorption (GSA), and excited state absorption (ESA) in erbium ions of the EDF, which produces green light signals, the majority of which pump signals have a wavelength at which the probability of occurrence of ESA in the EDF is greater than the probability of occurrence of GSA in the EDF.

By green signals, it is meant signals which each have a wavelength which lies in the range approximately 520 nm to approximately 560 nm.

By choosing such pump signal wavelengths, the occurrence of ESA is privileged with respect to the occurrence of GSA in the EDF. Once some ground state erbium ions have undergone GSA, further incident pump signals will be more likely to be absorbed in ESA of these pump state erbium ions than in GSA of other ground state erbium ions. The enhanced occurrence of ESA will result in enhanced production of green light signals, with regard to that of known EDFs. As already stated, it has been realised by the inventors that green light signals have a number of advantageous applications, and that the production of these signals is therefore desirable.

Preferably, at least 60% of the pump signals have a wavelength at which the probability of occurrence of ESA in the EDF is greater than the probability of occurrence of GSA in the EDF.

There are a number of pump signals wavelengths which may be used, at which the probability of occurrence of ESA within the EDF will be greater than the probability of occurrence of GSA within the EDF. The majority of the pump signals may have a wavelength in the range approximately 920 nm to approximately 980 nm. The majority of the pump signals may have a wavelength in the region of 960 nm.

The probability of occurrence (or cross section) of GSA and the probability of occurrence (or cross section) of ESA versus wavelength spectra for EDFs exhibit a number of regions of enhanced cross section, in the form of peaks. A GSA cross section peak and an ESA cross section peak occur together at a number of particular wavelengths, with the ESA cross section peak generally down-shifted in wavelength with regard to the GSA cross section peak. For example, there is a peak in both the GSA and ESA cross section versus wavelength spectra in the region of 980 nm. For each GSA/ESA cross section peak set, because of the ESA down-shift, at a particular wavelength the upper side of the ESA peak will intersect the lower side of the GSA peak, i.e. a crossover point between the GSA and ESA peaks exists at a crossover wavelength. The actual crossover wavelength will vary from EDF to EDF and will depend, for example, on the composition of the EDF. At wavelengths less than the crossover wavelength, the cross section of ESA will be greater than the cross section of GSA, i.e. ESA will be privileged with respect to GSA at these wavelengths. The majority of the pump signals may have a wavelength less than the crossover wavelength of an EDF GSA and ESA cross section peaks crossover point. For the GSA/ESA cross section peak pair in the region of 980 nm, the crossover wavelength may occur between 920 nm and 980 nm, depending, for example, on the EDF, and the majority of the pump signals may have a wavelength in this range.

A pump source may be coupled to an EDF such that the pump signals are coupled into the EDF to propagate therealong in a first direction. Additionally, a pump source may be coupled to an EDF such that the pump signals are coupled into the EDF to propagate therealong in a second direction, opposite to the first direction. Two or more EDFs may be provided in a chain. A pump source may be coupled to a first EDF in the chain such that the pump signals are coupled into the EDF to propagate therealong in a first direction, and/or a pump source may be coupled to a last EDF in the chain such that the pump signals are coupled into the EDF to propagate therealong in a second direction, opposite to the first direction. The or each pump source may be coupled to an EDF using a pump coupler.

The or each or some of the pump sources may comprise a laser diode. The or each or some of the pump sources may comprise a distributed feedback (DFB) laser. The or each or some of the pump sources may comprise a Fabry-Perot laser. The or each or some of the Fabry-Perot lasers may output pump signals having wavelengths in the range approximately 940 nm to approximately 1000 nm. The or each or some of the pump sources may output a power level in the range approximately 50 mW to approximately 1 W, or higher. The level of green light signal production is directly proportional to the output power level of the or each pump source.

The method of producing green light signals may comprise reflecting at least some pump signals escaping from the or each or some of the EDFs back into the EDF. This may comprise placing a pump signal reflector at a first end of the or each or some of the EDFs, and/or placing a pump signal reflector at a second end of the or each or some of the EDFs. Two or more EDFs may be provided in a chain, and this may comprise placing a pump signal reflector at an outer end of a first EDF in the chain, and/or placing a pump signal reflector at an outer end of a last EDF in the chain. In such an arrangement, the or each pump signal reflector may comprise part of a device for producing green light signals, or may be placed outside the device. The or each or some of the pump signal reflectors may reflect pump signals having wavelengths in the range approximately 920 nm to approximately 980 nm. The or each or some of the pump signal reflectors may comprise a grating. Using such reflectors will increase the production of the green light signals.

The or each or some of the EDFs may be in the form of a coil of fibre. The or each or some of the EDFs may comprise different dopants, the concentration of which is chosen to enhance the occurrence of ESA and result in enhanced production of green light signals, with regard to that of known EDFs. The or each or some of the EDFs may have one or more of the following characteristics: absorption peak at approximately 1530 nm of approximately 6 dB/m to approximately 8 dB/m, mode field diameter of approximately 5.3 μm, numerical aperture of approximately 0.25 to approximately 0.29, a cut-off in the range of approximately 850 nm to approximately 970 nm. The or each or some of the EDFs may have a length in the range of approximately 5 cm, e.g. with a heavy dopant concentration or using different bulk material, to approximately 80 m, which may depend on the absorption coefficient of the fibre.

According to a third aspect of the invention there is provided a method of amplification of traffic-carrying signals in an erbium doped fibre amplifier (EDFA), comprising, pumping the EDFA with green light signals produced by the method according to the first aspect of the invention.

According to a fourth aspect of the invention there is provided an erbium doped fibre amplifier (EDFA) for amplifying traffic-carrying signals, which is pumped by green light signals produced by the method according to the first aspect of the invention.

The absorption versus wavelength spectra of EDFs exhibit a peak in the region of 550 nm, which is larger than the peak in the region of 980 nm. Thus the absorption of green light signals by an EDF will be high, and, in particular, will be higher than the absorption of 980 nm signals. When 980 nm ESA occurs within an EDFA, this populates a number of excited states. Some of the electrons in these states will decay to the ground state spontaneously resulting in the production of green light signals. Some of these signals will interact with electrons in the excited states causing them to decay to lower states, i.e. stimulated emission occurs, and this results in the production of photons having wavelengths of approximately 800 nm, 1480 nm and 1530 nm. The 800 nm and 1480 nm photons are absorbed by the EDFA and result in the population of the metastable state (i.e. behave as pump signals), and subsequent amplification of traffic-carrying signals having wavelengths around 1550 nm. The 1530 nm photons amplify the traffic-carrying signals in a direct way. So, it can be seen that green light signals, when absorbed in an EDFA, will provide amplification of traffic-carrying signals having wavelengths around 1550 nm. In pumping the EDFA with green light signals produced by the method of the first aspect of the invention, as the production of the green light signals is enhanced over that which would occur in known EDFs, and as the absorption of such green light pump signals in EDFs is higher than the absorption of other, e.g. 980 nm, pump signals, the amplification produced by the above method will be greater than that of known EDFAs.

The green light signals may be produced substantially externally to the EDFA, and may be coupled into the EDFA. The green light signals may be produced using one or more devices according to the second aspect of the invention, coupled to the EDFA. A device may be coupled to a first end of the EDFA, and/or a device may be coupled to a second end of the EDFA. The EDFA may comprise one or more EDFs. One or more devices may be coupled to the or each or some of the EDFs. A co-directional device may be coupled to an EDF, i.e. green light signals are coupled into the EDF to propagate therealong in the same direction as the traffic-carrying signals. Additionally or alternatively, a counter-directional device may be coupled to an EDF, i.e. green light signals are coupled into the EDF to propagate therealong in the opposite direction to the traffic-carrying signals. The EDFA may comprise two or more EDFs in a chain, and a co-directional device may be coupled to a first EDF in the chain, and/or a counter-directional device may be coupled to a last EDF in the chain. The or each device may be coupled to an EDF using a coupler.

The green light signals may be produced substantially within the EDFA. This may comprise pumping the EDFA with one or more pump sources coupled to the EDFA, in which the majority of the pump signals have a wavelength at which the probability of occurrence of ESA in the EDFA is greater than the probability of occurrence of GSA in the EDFA. Preferably, at least 60% of the pump signals have a wavelength at which the probability of occurrence of ESA in the EDF is greater than the probability of occurrence of GSA in the EDF. The majority of the pump signals may have a wavelength in the range approximately 920 m to approximately 980 nm. The majority of the pump signals may have a wavelength in the region of 960 nm. The majority of the pump signals may have a wavelength less than the crossover wavelength of an EDF GSA and ESA cross section peaks crossover point. A pump source may be coupled to a first end of the EDFA, and/or a pump source may be coupled to a second end of the EDFA. The EDFA may comprise one or more EDFs. One or more pump sources may be coupled to the or each or some of the EDFs. A co-directional pump source may be coupled to an EDF, i.e. pump signals are coupled into the EDF to propagate therealong in the same direction as the traffic-carrying signals. Additionally or alternatively, a counter-directional pump source may be coupled to an EDF, i.e. pump signals are coupled into the EDF to propagate therealong in the opposite direction to the traffic-carrying signals. The EDFA may comprise two or more EDFs in a chain, and a co-directional pump source may be coupled to a first EDF in the chain, and/or a counter-directional pump source may be coupled to a last EDF in the chain. The or each pump source may be coupled to an EDF using a pump coupler. Using one or more such pump sources, some of the pump signals will give rise to GSA, ESA and green light signal production, and subsequent amplification of traffic-carrying signals. Other pump signals will give rise to GSA and amplification of traffic-carrying signals. The two amplification processes work together resulting in an EDFA with even greater amplification than known EDFAs.

The or each or some of the pump sources may comprise a laser diode. The or each or some of the pump sources may comprise a distributed feedback (DFB) laser. The or each or some of the pump sources may comprise a Fabry-Perot laser. The or each or some of the Fabry-Perot lasers may output pump signals having wavelengths in the range approximately 940 nm to approximately 1000 nm. The or each or some of the pump sources may output a power level in the range approximately 50 mW to approximately 1 W, or higher. The level of green light signal production and therefore amplification is directly proportional to the output power level of the or each pump source.

The method of amplification may comprise reflecting at least some pump signals escaping from the EDFA back into the EDFA. This may comprise placing a pump signal reflector at a first end of the EDFA, and/or placing a pump signal reflector at a second end of the EDFA. The or each pump signal reflector may comprise part of the EDFA, or may be placed outside the EDFA. The EDFA may comprise one or more EDFs. Reflecting the pump signals may comprise placing a pump signal reflector at a first end of the or each or some of the EDFs, and/or placing a pump signals reflector at a second end of the or each or some of the EDFs. The EDFA may comprise two or more EDFs in a chain. Reflecting the pump signals may comprise placing a pump signal reflector at an outer end of a first EDF in the chain, and/or placing a pump signal reflector at an outer end of a last EDF in the chain. The or each or some of the pump signal reflectors may reflect pump signals having wavelengths in the range approximately 920 nm to approximately 980 nm. Using such reflectors will increase the amplification of the EDFA. The or each or some of the pump signal reflectors may comprise a grating.

The method of amplification may comprise reflecting at least some green light signals escaping from the EDFA back into the EDFA. This may comprise placing a green light signal reflector at a first end of the EDFA, and/or placing a green light signal reflector at a second end of the EDFA. The or each green light reflector may comprise part of the EDFA, or may be placed outside the EDFA. The EDFA may comprise one or more EDFs. Reflecting the green light signals may comprise placing a green light signal reflector at a first end of the or each or some of the EDFs, and/or placing a green light signals reflector at a second end of the or each or some of the EDFs. The EDFA may comprise two or more EDFs in a chain. Reflecting the green light signals may comprise placing a green light signal reflector at an outer end of a first EDF in the chain, and/or placing a green light signal reflector at an outer end of a last EDF in the chain. The or each or some of the green light signal reflectors may reflect signals having wavelengths in the range approximately 520 nm to approximately 560 nm. The or each or some of the green light signal reflectors may comprise a grating. Using such reflectors will increase the amplification of the EDFA.

The method of amplification may also comprise substantially preventing green light signals from being transmitted from the EDFA. This may comprise placing at least one green light signal reflector at an input end of the EDFA, and/or placing at least one green light reflector at an output end of the EDFA. The or each green light signal reflector may comprise part of the EDFA, or may be placed outside the EDFA. This has a major advantage when the EDFA is preceded or followed in a network by an element which would be damaged if it were to receive green light signals.

The EDFA may comprise one or more EDFs. In particular, the EDFA may comprise two EDFs in a chain. Such an EDFA will therefore have two stages of amplification, one in each EDF. The EDFs may be connected by an inter-stage. The inter-stage may comprise, for example, a tap or a coupler or a splitter or a photodiode or a variable optical attenuator or a filter or an isolator. The or each or some of the EDFs may be in the form of a coil of fibre. The or each or some of the EDFs may comprise different dopants, the concentration of which is chosen to enhance the occurrence of ESA and result in enhanced production of green light signals, with regard to that of known EDFs. The or each or some of the EDFs may have one or more of the following characteristics: absorption peak at approximately 1530 nm of approximately 6 dB/m to approximately 8 dB/m, mode field diameter of approximately 5.3 µm, numerical aperture of approximately 0.25 to approximately 0.29, a cut-off in the range of approximately 850 nm to approximately 970 nm. The or each or some of the EDFs may have a length in the range of approximately 5 cm, e.g. with a heavy dopant concentration or using different bulk material, to approximately 80 m, which may depend on the absorption coefficient of the fibre. Green light signals will be absorbed in an EDF to a greater extent than, for example, 980 nm signals. To achieve a desired amplification in an EDFA, the length of the or each EDF therein may be reduced when the EDFA is pumped with green light signals, in comparison to the length of EDFs in an EDFA pumped with e.g. 980 nm signals. Such shorter length EDFs provide major advantages with regard to size, manufacture, maintenance, and cost etc of the green-pumped EDFA.

The EDFA may comprise one or more gain flattening filters. The EDFA may comprise one or more isolators. These may allow traffic-carrying signals to pass through them, but may prevent backward amplified spontaneous emission (ASE) signals from passing through them.

The traffic-carrying signals may have wavelengths in the C-band, i.e. approximately 1530 nm to approximately 1560 nm. The EDFA may comprise a C-band EDFA. The C-band EDFA may comprise one or more EDF coils, with a length that varies according to the EDF absorption coefficient, e.g. if the absorption coefficient is in the range approximately 6 dB/km to approximately 8 dB/km coils up to approximately 80 m in length may be required. The traffic-carrying signals may have wavelengths in the L-band, i.e. approximately 1570 nm to approximately 1610 nm. The EDFA may comprise a L-band EDFA. The L-band EDFA may comprise one or more EDF coils, with a length that varies according to the EDF absorption coefficient, e.g. if the absorption coefficient is in the range approximately 12 dB/km to approximately 15 dB/m coils up to approximately 40 m in length may be required.

According to a fifth aspect of the invention there is provided a laser which produces green light signals, comprising at least one erbium doped fibre (EDF), coupled to at least one pump source to receive pump signals therefrom, which cause ground state absorption (GSA), and excited state absorption (ESA) in erbium ions of the EDF, which produces green light signals, the majority of which pump signals have a wavelength at which the probability of occurrence of ESA in the EDF is greater than the probability of occurrence of GSA in the EDF.

Preferably, at least 60% of the pump signals have a wavelength at which the probability of occurrence of ESA in the EDF is greater than the probability of occurrence of GSA in the EDF.

The majority of the pump signals may have a wavelength in the range approximately 920 nm to approximately 980 nm. The majority of the pump signals may have a wavelength in the region of 960 nm. The majority of the pump signals may have a wavelength less than the crossover wavelength of an EDF GSA and ESA cross section peaks crossover point. Use of such pump sources will enable the generation of considerable green light signal power in the laser.

A pump source may be coupled to an EDF such that the pump signals are coupled into the EDF to propagate therealong in a first direction. Additionally or alternatively, a pump source may be coupled to an EDF such that the pump signals are coupled into the EDF to propagate therealong in a second direction, opposite to the first direction. The laser may comprise two or more EDFs in a chain. A pump source may be coupled to a first EDF in the chain such that the pump signals are coupled into the EDF to propagate therealong in a first direction, and/or a pump source may be coupled to a last EDF in the chain such that the pump signals are coupled into the EDF to propagate therealong in a second direction, opposite to the first direction. The or each pump source may be coupled to an EDF of the laser using a pump coupler.

The or each or some of the pump sources may comprise a laser diode. The or each or some of the pump sources may comprise a distributed feedback (DFB) laser. The or each or some of the pump sources may comprise a Fabry-Perot laser. The or each or some of the Fabry-Perot lasers may output pump signals having wavelengths in the range approximately 940 nm to approximately 1000 nm. The or each or some of the pump sources may output a power level in the range approximately 50 mW to approximately 1 W, or higher. The level of green light signal production is directly proportional to the output power level of the or each pump source.

The laser may be provided with means to reflect at least some pump signals escaping from the laser back into the laser. A pump signal reflector may be placed at a first end of the laser, and/or a pump signal reflector may be placed at a second end of the laser. The or each pump signal reflector may comprise part of the laser, or may be placed outside the laser. The laser may comprise one or more EDFs, and a pump signal reflector may be placed at a first end of the or each or some of the EDFs, and/or a pump signal reflector may be placed at a second end of the or each or some of the EDFs. The laser may comprise two or more EDFs in a chain. A pump signal reflector may be placed at an outer end of a first EDF in the chain, and/or a pump signal reflector may be placed at an outer end of a last EDF in the chain. The or each or some of the pump signal reflectors may reflect pump signals having wavelengths in the range approximately 920 nm to approximately 980 nm. The or each or some of the pump signal reflectors may comprise a grating. The use of one or more reflectors will cause the pump signals to bounce to and fro along the length of the laser/EDF(s), and will increase the chance of complete absorption of the pump signals and subsequent production of green light signals. Use of such reflectors will therefore enable the generation of considerable green light signal power in the laser, and will increase the efficiency of the laser.

The or each or some of the EDFs may be in the form of a coil of fibre. The or each or some of the EDFs may comprise different dopants, the concentration of which is chosen to enhance the occurrence of ESA and result in enhanced production of green light signals, with regard to that of known EDFs. The or each or some of the EDFs may have one or more of the following characteristics: absorption peak at approximately 1530 nm of approximately 6 dB/m to approximately 8 dB/m, mode field diameter of approximately 5.3 µm, numerical aperture of approximately 0.25 to approximately 0.29, a cut-off in the range of approximately 850 nm to approximately 970 nm. The or each or some of the EDFs may have a length in the range of approximately 5 cm, e.g. with a heavy dopant concentration or using different bulk material, to approximately 80 m, which may depend on the absorption coefficient of the fibre. The or each or some of the EDFs may have a length of a few tens of centimetres. Using such short EDF lengths will avoid undue absorption of the green light signals within the laser. The size of the laser may also be reduced, in comparison with known green light lasers. The size of the laser may be in the region of 50 mm×50 mm×20 mm.

The proposed green light laser may comprise one or more commercially available EDFs, pump sources, pump couplers and gratings. Such a laser may therefore be easily manufactured, used, and maintained, and will be cost-effective. This is in comparison to existing green light lasers which are complex and bulky making them difficult to use and expensive. The green light laser of the invention has many advantageous applications. For example, such a laser could be used for display/imaging applications, such as in cathode ray tubes in conjunction with red and blue lasers, and could be used to pump EDFAs with green light signals.

According to a sixth aspect of the invention there is provided a method of pumping an EDFA with green light signals, comprising coupling green light signals from a laser according to the fifth aspect of the invention into the EDFA.

Figure 2:
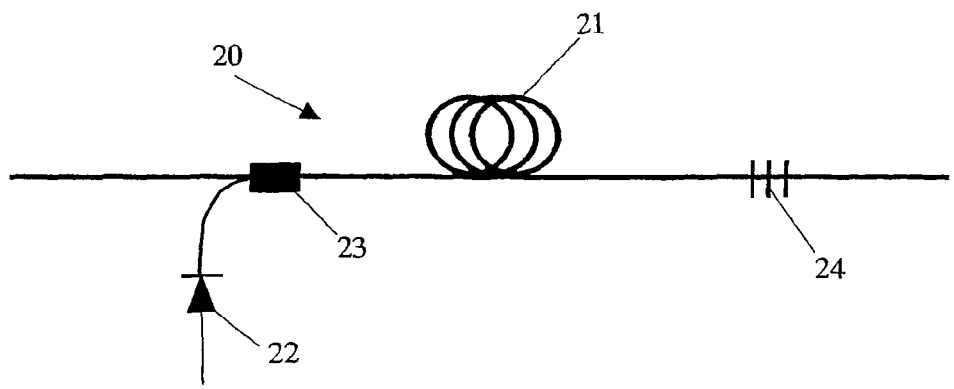

Embodiments of the invention will now be described by way of example only, with reference to the accompanying drawings, in which:

FIG. 1 is a schematic representation of an erbium doped fibre amplifier according to the fourth aspect of the invention, and FIG. 2 is a schematic representation of a laser according to the fifth aspect of the invention.

FIG. 1 shows a two stage erbium doped fibre amplifier (EDFA) 1, which amplifies traffic-carrying signals travelling along the EDFA in the direction of the arrow A. The EDFA comprises a first erbium doped fibre (EDF) 2 and a second EDF 3, each in the form of a coil of fibre. The EDFs are connected by an inter-stage 4. A co-directional pump source 5 is coupled to a first end of the EDFA by a coupler 6, and a counter-directional pump source 7 is coupled to a second end of the EDFA by a coupler 8. Each pump source outputs a power level in the range approximately 50 mW to approximately 250 mW. The EDFA is pumped with green light signals produced within it. This is achieved by pumping the EDFA with pump sources 5, 7 which produce pump signals the majority of which have a wavelength in the region of 960 nm. Pump signals from the pump sources 5, 7 coupled into the EDFA 1, are absorbed by the erbium ions in the EDFs, giving rise to GSA, ESA and the production of green light signals. For these EDFs, the occurrence of ESA is privileged with respect to the occurrence of GSA at these pump signal wavelengths, and the production of the green light signals is therefore enhanced. The green light signals interact with erbium ions in the EDFs, resulting in the production of photons having wavelengths of approximately 800 nm, 1480 nm and 1530 nm. The 800 nm and 1480 nm photons are absorbed by the EDFA and result in the population of the metastable state (i.e. behave as pump signals), and subsequent amplification of traffic-carrying signals having wavelengths around 1550 nm. The 1530 nm photons amplify the traffic-carrying signals in a direct way. Therefore the green light signals, when absorbed in the EDFA, provide amplification of the traffic carrying signals.

A pump signal reflector 9 is placed outside the EDFA 1 at the first end thereof, and a pump signal reflector 10 is placed outside the EDFA at the second end thereof. Each pump signal reflector comprises a grating, and reflects pump signals having wavelengths in the region of 960 nm. At least some of the pump signals from each of the pump sources 5, 7 which escape from the EDFA 1, will be reflected back into the EDFA, and this increases the amplification achieved by the EDFA.

A green light signal reflector 11 is placed outside the EDFA 1 at the first end thereof, and a green light signal reflector 12 is placed outside the EDFA at the second end thereof. Each green light signal reflector comprises a grating, and reflects signals having wavelengths in the range approximately 520 nm to approximately 560 nm. At least some of the green light signals produced within the EDFs 2, 3 which escape therefrom, will be reflected back into the EDFA, and this increases the amplification of the EDFA. The inter-stage 4 may also comprise one or more pump signal reflectors and/or one or more green light signal reflectors.

The green light signal reflectors 11, 12 will also substantially prevent green light signals from being transmitted from the EDFA 1. This has a major advantage when the EDFA is preceded and/or followed in a network by an element which would be damaged if it were to receive green light signals.

FIG. 2 shows a laser 20 which produces green light signals. This comprises an EDF 21 in the form of a coil of fibre. The laser is pumped with a pump source 22 coupled to the laser by a coupler 23. The pump source outputs a power level in the range approximately 50 mW to approximately 250 mW. The pump source produces pump signals the majority of which have a wavelength in the region of 960 nm. Pump signals are coupled into the laser 20, and are absorbed by the erbium ions of the EDF 21, giving rise to GSA, ESA and the production of green light signals, which are output from the laser. The occurrence of ESA is privileged with respect to the occurrence of GSA in this EDF 21 at these pump signal wavelengths, and the production of the green light signals is therefore enhanced. The length of the EDF 21 is approximately 10 cm. By keeping the EDF length to a minimum, absorption of the green light signals within the laser is decreased. The size of the laser is also reduced, and can be of the order of 50 mm×50 mm×20 mm.

A pump signal reflector 24 is placed outside the laser at a second end thereof. The pump signal reflector comprises a grating, and reflects pump signals having wavelengths in the region of 960 nm. At least some of the pump signals which escape from the laser, will be reflected back into it, and this increases the green light signal power achieved by the laser.

The invention claimed is:

1. A method of amplification of traffic-carrying signals in an erbium doped fiber amplifier (EDFA), comprising the steps of:

coupling pump signals from at least one pump source into at least one erbium doped fiber (EDF) to cause ground state absorption (GSA) and excited state absorption (ESA) in erbium ions of the EDF for producing green light signals, a majority of the pump signals having a wavelength at which a probability of occurrence of the ESA in the EDF is greater than a probability of occurrence of the GSA in the EDF;

receiving the traffic-carrying signals at the EDFA; and pumping the EDFA with the green light signals to amplify the traffic-carrying signals.

2. The method of amplification according to claim 1, in which 60% of the pump signals have a wavelength at which the probability of occurrence of the ESA in the EDF is greater than the probability of occurrence of the GSA in the EDF.

3. The method of amplification according to claim 1, in which the majority of the pump signals have a wavelength in a range from approximately 920 nm to approximately 980 nm.

4. The method of amplification according to claim 3, in which the majority of the pump signals have a wavelength in a region of 960 nm.

5. The method of amplification according to claim 1, in which the majority of the pump signals have a wavelength less than a crossover wavelength of an EDF's GSA and ESA cross-section peaks crossover point.

6. The method of amplification according to claim 1, and producing the green light signals substantially externally to the EDFA, and coupling the green light signals into the EDFA.

7. The method of amplification according to claim 6, in which the EDFA comprises at least one EDF, and coupling the green light signals to the at least one EDF.

8. The method of amplification according to claim 7, and coupling a co-directional device to the EDF so that the green light signals propagate in a same direction as the traffic-carrying signals.

9. The method of amplification according to claim 7, and coupling a counter-directional device to the EDF so that the green light signals propagate in an opposite direction as the traffic-carrying signals.

10. The method of amplification according to claim 1, and producing the green light signals substantially within the EDFA.

11. The method of amplification according to claim 10, in which the EDFA comprises at least one EDF, and coupling the at least one pump source to the at least one EDF.

12. The method of amplification according to claim 11, and coupling a co-directional pump source to the EDF so that the pump signals propagate in a same direction as the traffic-carrying signals.

13. The method of amplification according to claim 11, and coupling a counter-directional pump source to the EDF so that the pump signals propagate in an opposite direction as the traffic-carrying signals.

14. The method of amplification according to claim 1, and reflecting at least some of the pump signals escaping from the EDFA back into the EDFA.

15. The method of amplification according to claim 14, in which the reflecting step is performed by placing a pump signal reflector at a first end of the EDFA, and by placing another pump signal reflector at a second end of the EDFA.

16. The method of amplification according to claim 14, in which the EDFA comprises at least one EDF, and the reflecting step is performed by placing a pump signal reflector at a first end of the at least one EDF, and by placing another pump signal reflector at a second end of the at least one EDF.

17. The method of amplification according to claim 15, in which the pump signal reflectors reflect the pump signals having a wavelength in a range from approximately 920 nm to approximately 980 nm.

18. The method of amplification according to claim 1, and reflecting at least some of the green light signals escaping from the EDFA back into the EDFA.

19. The method of amplification according to claim 18, in which the reflecting step is performed by placing a green light signal reflector at a first end of the EDFA, and by placing another green light signal reflector at a second end of the EDFA.

20. The method of amplification according to claim 18, in which the EDFA comprises at least one EDF, and in which the reflecting step is performed by placing a green light signal reflector at a first end of the at least one EDF, and by placing another green light signal reflector at a second end of the at least one EDF.

21. The method of amplification according to claim 1, and substantially preventing the green light signals from being transmitted from the EDFA.

22. The method of amplification according to claim 21, in which the preventing step is performed by placing a green light signal reflector at an input end of the EDFA, and by placing another green light signal reflector at an output end of the EDFA.

23. An erbium doped fiber amplifier (EDFA) for amplifying traffic-carrying signals, comprising:
at least one erbium doped fiber (EDF) coupled to at least one pump source to receive pump signals therefrom to cause ground state absorption (GSA) and excited state absorption (ESA) in erbium ions of the EDF to produce green light signals, a majority of the pump signals having a wavelength at which a probability of occurrence of the ESA in the EDF is greater than a probability of occurrence of the GSA in the EDF; an EDFA input for receiving the traffic-carrying signals, and wherein the EDFA is arranged to be pumped by the green light signals to amplify the traffic-carrying signals.

24. The amplifier according to claim 23, in which 60% of the pump signals have a wavelength at which the probability of occurrence of the ESA in the EDF is greater than the probability of occurrence of the GSA in the EDF.

25. The amplifier according to claim 23, in which the majority of the pump signals have a wavelength in a range from approximately 920 nm to approximately 980 nm.

26. The amplifier according to claim 25, in which the majority of the pump signals have a wavelength in a region of 960 nm.

27. The amplifier according to claim 23, in which the majority of the pump signals have a wavelength less than a crossover wavelength of an EDF's, GSA and ESA cross-section peaks crossover point.

28. The amplifier according to claim 23, in which a co-directional pump source is coupled to the EDF so that the pump signals are coupled into the EDF to propagate therealong in a same direction as the traffic-carrying signals.

29. The amplifier according to claim 28, in which a counter-directional pump source is coupled to the EDF so that the pump signals are coupled into the EDF to propagate therealong in an opposite direction as the traffic-carrying signals.

30. The amplifier according to claim 23, in which at least some of the pump signals escaping from the EDFA are reflected back into the EDFA.

31. The amplifier according to claim 30, in which a pump signal reflector is placed at a first end of the at least one EDF, and another pump signal reflector is placed at a second end of the at least one EDF to reflect the pump signals.

32. The amplifier according to claim 31, in which the pump signal reflectors reflect the pump signals having a wavelength in a range from approximately 920 nm to approximately 980 nm.

33. The amplifier according to claim 23, in which at least some of the green light signals escaping from the EDFA are reflected back into the EDFA.

34. The amplifier according to claim 33, in which a green light signal reflector is placed at a first end of the EDFA, and another green light signal reflector is placed at a second end of the EDFA to reflect the green light signals.

35. The amplifier according to claim 33, in which the EDFA comprises at least one EDF, and a green light signal reflector is placed at a first end of the at least one EDF, and another green light signal reflector is placed at a second end of the at least one EDF to reflect the green light signals.

* * * * *

UNITED STATES PATENT AND TRADEMARK OFFICE
CERTIFICATE OF CORRECTION

| | |
|---|---|
| PATENT NO. | : 7,822,078 B2 |
| APPLICATION NO. | : 12/004137 |
| DATED | : October 26, 2010 |
| INVENTOR(S) | : Fella et al. |

It is certified that error appears in the above-identified patent and that said Letters Patent is hereby corrected as shown below:

In Column 4, Line 56, delete "920 m" and insert -- 920 nm --, therefor.

Signed and Sealed this
Fifteenth Day of March, 2011

David J. Kappos
*Director of the United States Patent and Trademark Office*